Aug. 16, 1938.    J. W. CULBERTSON    2,126,740
DRIFT RECORDING APPARATUS
Filed Oct. 23, 1936
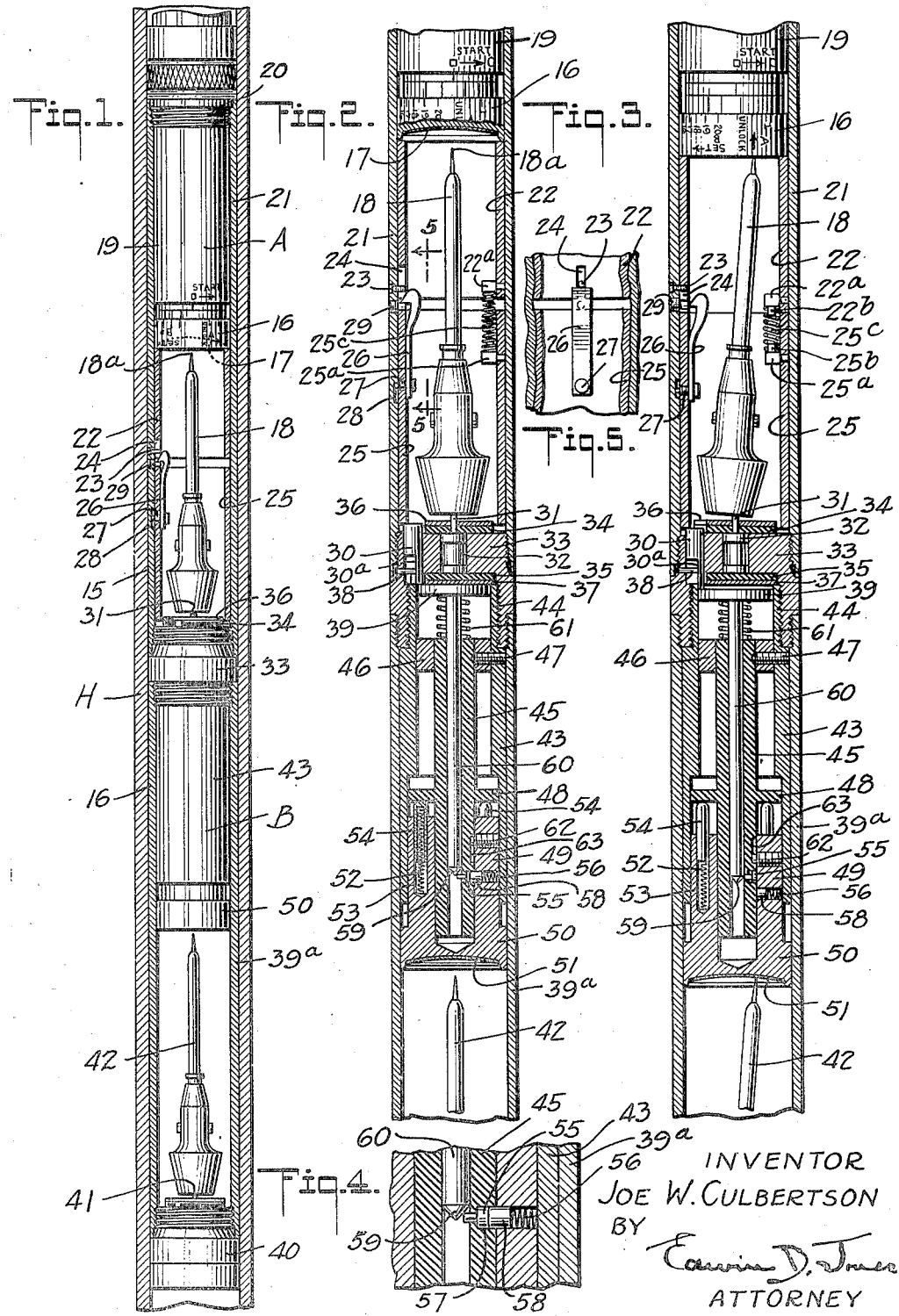
INVENTOR
JOE W. CULBERTSON
BY
ATTORNEY Patented Aug. 16, 1938

2,126,740

UNITED STATES PATENT OFFICE 2,126,740

DRIFT RECORDING APPARATUS

Joe W. Culbertson, West Hollywood, Calif., assignor to Technical Oil Tool Corporation, Ltd., a corporation of California Application October 23, 1936, Serial No. 107,215

8 Claims. (Cl. 33—205.5)

My invention relates to apparatus for recording the drift or deviation of a well hole or other earth bore from the vertical, and it is in part a continuation of my co-pending application, Ser. No. 14,479, filed April 3, 1935.

It is a purpose of my invention to provide a drift recording apparatus which embodies at least two drift recording instruments dependently or independently operable when in a well hole or drill pipe to effect separate recordations at a common point in the well so as to permit an operator to compare the recordations in a determination of the correctness of the recordation made by the apparatus as a whole in respect to the true degree of deviation of the well hole from the vertical.

It is also a purpose of my invention to provide a drift recording apparatus which embodies a main instrument having time-controlled means for effecting automatically an angle recordation a predetermined time after setting of the instrument, and a subsidiary instrument operable by and concurrently with the main instrument to effect a second angle recordation for comparison with the first recordation in a positive determination of the angular accuracy of recordation made by the apparatus as a whole.

A further purpose of my invention is the provision of a method of determining the falsity or correctness of an angle recordation made by a drift recording instrument, which comprises dropping or lowering with that instrument a second instrument having an angle marker of the same character as that of the first instrument and operating about a center vertically alined therewith, so as to obtain separate recordations at substantially the same point and instant within a well hole; withdrawing the instruments from the well hole; and then comparing the records made by the two instruments. If the angles of deviation so recorded are the same for both instruments then the apparatus is correct in its recordation of the true angle of deviation of the well hole from the vertical. If the recordations differ in degree of angle and circumferential position on the charts of the instruments, then it is certain that the angle marker for one or both of the instruments was not at a standstill when the record was made, thus conclusively showing that the recording is incorrect.

In the accompanying drawing:

Fig. 1 is a fragmentary vertical sectional view of one form of drift recording apparatus embodying my invention having a main instrument and one subsidiary instrument.

Fig. 2 is a view similar to Fig. 1 but enlarged and showing the subsidiary instrument in vertical section, with both instruments in set position.

Fig. 3 is a view identical to Fig. 2 except that the two instruments are in recording or tripped position.

Fig. 4 is an enlarged fragmentary sectional view of the latch bolt and adjacent parts of the subsidiary instrument.

Fig. 5 is an enlarged view taken on the line 5—5 of Fig. 2 and looking in the direction of the arrows.

In Fig. 1 is shown part of a tubular housing H in which main and subsidiary drift recording instruments A and B are contained for lowering or dropping into an open well hole or a drill tubing. The main instrument A may be constructed in accordance with the time-controlled instrument disclosed in my co-pending application above referred to to cause a head 16 carrying a chart 17 to be projected downwardly into engagement with angle marker 18 of the plumb-bob type for marking on the chart a recordation of the angle of deviation of the well hole from the vertical, it being understood that the mechanism can be manually set to trip the head at a predetermined time after setting.

The head 16 is movably mounted on the lower end of a barrel 19 containing the time-controlled mechanism and the barrel in turn is provided with a cap 20 threaded in the upper end of a tubular container 21 disposed within the housing H. Beneath the head 16 is an upper sleeve 22, and although movable axially in the container to occupy lowered and elevated positions, its circumferential position is fixed by a screw 23 threaded in the container and projecting into a slot 24 in the sleeve. Below this upper sleeve is a lower sleeve 25 likewise movable axially in the container to occupy upper and lower positions.

A spring latch 26 is secured to the inner side of the sleeve 25 by a screw 27, and this screw projects into a recess 28 for fixing the circumferential position of the sleeve. Normally, the sleeve 25 is retained in elevated position by means of the latch 26, the bill thereof engaging a keeper 29 screwed in the container 21. Movement of the latch to release the sleeve 25 is effected by partial downward movement of the upper sleeve 22, the upper sleeve normally reposing on the head of the latch so that its downward movement cams the latch free of the keeper. With continued downward movement of the upper sleeve, the lower sleeve is moved to actuate a bolt 30. The upper sleeve is adapted to be yieldingly maintained in the elevation position shown in Fig. 2, by brackets 22ᵃ and 25ᵃ secured in the respective sleeves 22 and 25, and having pins 22ᵇ and 25ᵇ receiving the ends of a coiled expansible spring 25ᶜ.

Downward movement of the upper sleeve occurs when the head 16 is projected downward upon its release by the time controlled mechanism contained in the barrel 19. Such movement of the head also causes the chart 17 to be punched by the pointed end 18ᵃ of the marker 18. The marker is mounted to normally occupy a vertical position by means of a stem 31 and this stem is fixed in a block 32 contained within a coupling plug 33 and yieldingly confined therein by upper and lower rubber plates 34 and 35 secured in position by metal plates 36 and 37, respectively. Screws 36ᵃ are employed for securing the plate 36 in fixed position on the plug.

The plug 33, which is threaded into the lower end of the container 21, is recessed to slidably receive the bolt 30, the plates 34, 35, etc., being similarly recessed for the same purpose. The bolt 30 is secured against rotation by a pin 38 extending into a reduced part 30ᵃ of the bolt which has contact with a disk head 39.

The housing H receives a second or lower container 39 the upper end of which is screwed onto the plug 33, while its lower end is closed by a plug 40 threaded therein as shown in Fig. 1. Within the plug 40 is supported a stem 41 for an angle marker 42 of the same type as the marker 18, and the stem in turn may be yieldingly supported therein in the same manner as the stem 31. Above the marker 42 is a second barrel 43 in which the chart actuating mechanism of the subsidiary recording instrument is contained. A collar 44 integral with the upper end of the barrel 43, is threaded into the coupling plug 33. This collar serves as a cylinder in which the head 39 is moved, and also as a means for holding the plates 35 and 37 in position within the plug.

The barrel 43 contains a guide sleeve 45 centered therein by a ring 46 secured in position by a set screw 47, and an annular flange 48 formed integral with the sleeve at a point medially of its length. Below this flange a body 49 is slidably fitted in the barrel 43, and on the lower end of this body is an integral head 50 carrying a chart 51. As with the head 16 of the main instrument, the head 50 is urged downwardly by springs 52 mounted in pockets 53 and sleeves 54 slidable in the pockets and having closed ends abutting the flange 48.

The body 49 is tubular to receive and be movable on the lower end of the guide sleeve 45, but normally, the body, together with the chart head is latched in the elevated position shown in Fig. 2 by means of a latch bolt 55. As best shown in Fig. 4, this bolt is mounted in the body and urged by a spring 56 into a recess 57 of the sleeve 45. Movable in the recess is an actuator 58 for the bolt 55 which projects into the bore of the sleeve 45 to be engaged by a cam 59 on the lower end of a rod 60 which is movable in the sleeve. The upper end of this rod is secured to the head 39, and a spring 61 urges the head and rod upwardly to the elevated position shown in Fig. 2. Downward movement of the body 49 under the action of the springs 52, is limited by means of a screw pin 62 in the body engaging within a recess 63 in the sleeve 45. In this position of the body, the chart 51 is punched by the angle marker 42, as will be later described.

The operation of the drift recording apparatus is as follows: Let it be assumed that the head 16 of the main instrument is in the elevated or set position shown in Fig. 2, and that the mechanism in the barrel 19 has been set to cause tripping thereof at a predetermined time after the apparatus has been lowered or dropped into an open hole or a drill pipe. Also, let it be assumed that the parts of the subsidiary instrument are in the positions shown in Fig. 2.

Upon tripping of the main instrument the head 16 is projected downwardly to cause the chart 17 to be punched and thus marked by the point of the marker 18 to record thereon the angle of deviation, if any, of the well hole from the vertical. As the head 16 is forced downwardly the sleeve 22 is depressed causing its lower edge to move the latch 26 out of engagement with the keeper 29 to release the lower sleeve 25. Continued movement of the upper sleeve forces the lower sleeve downwardly to the position shown in Fig. 3, wherein the bolt 30 is forced downwardly to impart a corresponding movement to the head 39 against the tension of the spring 61. During these movements of sleeve the spring 25ᶜ yields as will be understood.

With lowering of the head 39 the rod 60 is actuated to cause the cam 59 to move the actuator 58 radially outward until the inner end of the latch bolt 55 is flush with the surface of the sleeve 45, when the body 49 is released to permit the springs 52 to force the head 40 downwardly causing the chart 51 to be punched by the point of the marker 42.

To reset the two instruments for a second operation, it is necessary to remove them from the containers. Once removed the subsidiary instrument can be reset by manually pushing the head 40 back to its upper position in which the latch bolt 55 again engages the cam 59 under the action of the spring 56 to elevate and latch the rod in such position. With elevation of the rod the disk 39 is elevated likewise to raise the bolt 30 thereby lifting the sleeve, it being understood that with removal of the main instrument from the container the upper sleeve is elevated to its spaced position with respect to the lower sleeve. As the lower sleeve moves upwardly the latch 26 passes over and again engages the upper side of the keeper 29 to secure the sleeve in elevated position, and thus the two sleeves are reset for a second operation of the subsidiary instrument.

From the preceding description it will be manifest that my apparatus comprises two drift recording instruments in which the main instrument which is adapted to be set and tripped at a predetermined time after setting to effect one recordation or angular deviation, functions to operate the subsidiary instrument to effect a second recordation. If, in practice, the main instrument has been properly set so as to trip only after the angle marker thereof has ceased oscillation and come to a complete standstill, then the record made by the main instrument will be accurate or in strict accordance with the angle of deviation of the well hole from the vertical. Since the two angle markers swing about the same longitudinal axis and are disposed adjacent each other, the recordation made by the subsidiary instrument should be exactly the same as that made by the main instrument when the angle marker of the subsidiary has come to a standstill before tripping of the main instrument.

In actual practice, however, the main instrument is at times inadvertently so set that it trips before either or both of the angle markers of the two instruments come to a standstill so that a true record of the angle of deviation of the hole cannot be determined. If only a single instrument be employed one has no means of determining if the angle marker came to rest before the instrument was tripped, and, hence, no means of determining the accuracy of the recordation. However, by using two instruments whether the operation of one is dependent upon that of the other as in my apparatus or whether they are independently operable and set to trip at the same time, so long as they are positioned adjacent each other to operate about the same longitudinal axis, it is possible to determine if the angle markers of the two instruments were at a standstill when the instruments were tripped. If they were, then the angle of deviation recorded should be the same for both instruments, but if they were not, then the recordations will differ one from the other not only in degree but in direction or circumferential position about the charts. This would be due to the difference between the angle markers both in degree and direction of oscillation, for little would be the possibility of the two markers oscillating in the same direction and through the same arc at the same instant.

I claim:

1. A drift recording apparatus for well holes; comprising a main recording instrument having a pivoted angle marker, a chart carrying head, and time-controlled means for tripping said head to cause it to be marked by said marker on movement thereagainst; a subsidiary recording instrument having an angle marker pivoted on an axis alined with the pivot of the angle marker of the main instrument, a chart carrying head, tripping means for said head to cause it to be marked by said marker; and a mechanism operable by tripping movement of the head of the main instrument for actuating the tripping means for the head of the subsidiary instrument whereby, the instruments are caused simultaneously to effect drift recordations.

2. In a drift recording instrument; a barrel; a support fixed within the barrel; a chart carrying head movable in the barrel and on the support to occupy an upper position and a lower position; means for urging said head to the lower position; a latch carried by said head and normally engaging the support for securing the head in the upper position; a rod movable in the support to actuate said latch to release said head; and means for moving said rod, comprising a bolt for moving the rod, and a sleeve for moving the bolt.

3. In a drift recording instrument, a chart carrying head; a barrel in which said head is axially movable; means for urging said head to projected position on the barrel; a sleeve fixed in the barrel and extending into said head; a latch in the sleeve normally latching the head in retracted position in the barrel against the action of said urging means; and a member movable in the sleeve for actuating said latch to release said head.

4. In a drift recording instrument, a chart carrying head; a barrel in which said head is axially movable; means for urging said head to projected position on the barrel; a sleeve fixed in the barrel and extending into said head; a latch in the sleeve normally latching the head in retracted position in the barrel against the action of said urging means; a rod movable in the sleeve and having a cam for moving said latch to release said head; and means for urging the rod to a position in which said cam is effective to move said latch.

5. In a drift recording instrument; a barrel; a support fixed within the barrel; a chart carrying head movable in the barrel and on the support to occupy an upper position and a lower position; means for urging said head to the lower position; a latch carried by the head and normally engaging the support for securing the head in the upper position; a rod movable in the support to actuate said latch to release the head; means for urging said rod to a position in which it is ineffective to actuate said latch; and means for moving said rod against the action of said urging means to actuate the latch to release the head.

6. In a drift recording instrument; a barrel; a support fixed within the barrel; a chart carrying head movable in the barrel and on the support to occupy an upper position and a lower position; means for urging said head to the lower position; a latch carried by the head and normally engaging the support for securing the head in the upper position; a rod movable in the support to actuate said latch to release the head; means for urging said rod to a position in which it is ineffective to actuate said latch; and means for moving the rod against the action of said urging means to actuate the latch to release the head, comprising a bolt, a sleeve for moving the bolt, and means for moving the sleeve.

7. In a drift recording instrument; a barrel; a support fixed within the barrel; a chart carrying head movable in the barrel and on the support to occupy an upper position and a lower position; means for urging said head to the lower position; a latch carried by the head and normally engaging the support for securing the head in the upper position; a rod movable in the support to actuate said latch; means for urging said rod to a position in which it is ineffective to actuate said latch; and means for moving the rod against the action of said urging means to actuate the latch to release the head, comprising a bolt, a sleeve for moving the bolt, a second latch for securing the sleeve against movement to move the bolt, and means for actuating the second latch to release the sleeve and then move the sleeve to actuate said bolt.

8. In combination; a drift recording instrument having an angle marker; a chart-carrying head above the angle marker; a support for said head in which the latter is movable to occupy an upper position out of engagement with the angle marker and a lower position in which it is marked by the angle marker, means for urging said head to the lower position, latching means for retaining said head in the upper position against the action of said urging means; and a mechanism correlated to said latching means for actuating the latter to release the head, comprising a member movably supported above the head and urged upwardly, a bolt for moving said member downwardly against the action of said urging means, a sleeve movable downwardly to actuate the bolt, a latch for securing the sleeve in an elevated position, a second sleeve above the first movable downwardly to actuate the latter and release said latch, and means for moving the second sleeve downwardly.

JOE W. CULBERTSON.